No. 651,762. Patented June 12, 1900.
L. J. KLINGER.
WEEDER.
(Application filed Mar. 2, 1900.)

(No Model.)

WITNESSES:

INVENTOR
L. J. Klinger.
BY
ATTORNEYS

UNITED STATES PATENT OFFICE.

LOUIS JOHN KLINGER, OF DUFUR, OREGON.

WEEDER.

SPECIFICATION forming part of Letters Patent No. 651,762, dated June 12, 1900.

Application filed March 2, 1900. Serial No. 7,082. (No model.)

*To all whom it may concern:*

Be it known that I, LOUIS JOHN KLINGER, of Dufur, in the county of Wasco and State of Oregon, have invented a new and useful Improvement in Weeders, of which the following is a specification.

My invention relates to that class of agricultural implements or machines employed in destroying weeds in fallow ground or the like; and its object is certain improvements in such machines whereby the construction of the weeder relieves as much as possible the strain put upon the draft-animals, provides a very rigid and yet adjustable frame, and which embodies efficient means for raising and lowering the weed cutters or turners out of or into contact with the ground.

The invention consists in certain details of construction and arrangements and combinations of the parts, which I shall hereinafter specifically describe and claim.

Reference is to be had to the accompanying drawings, forming part of this specification, in which like characters of reference indicate corresponding parts in all the views.

Figure 1:
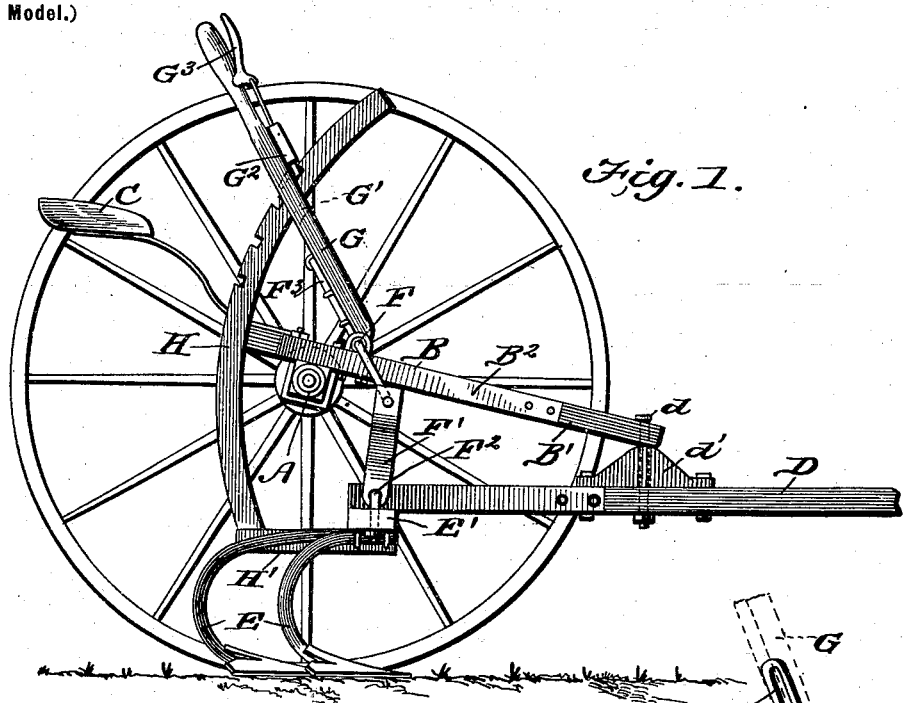
Figure 2:
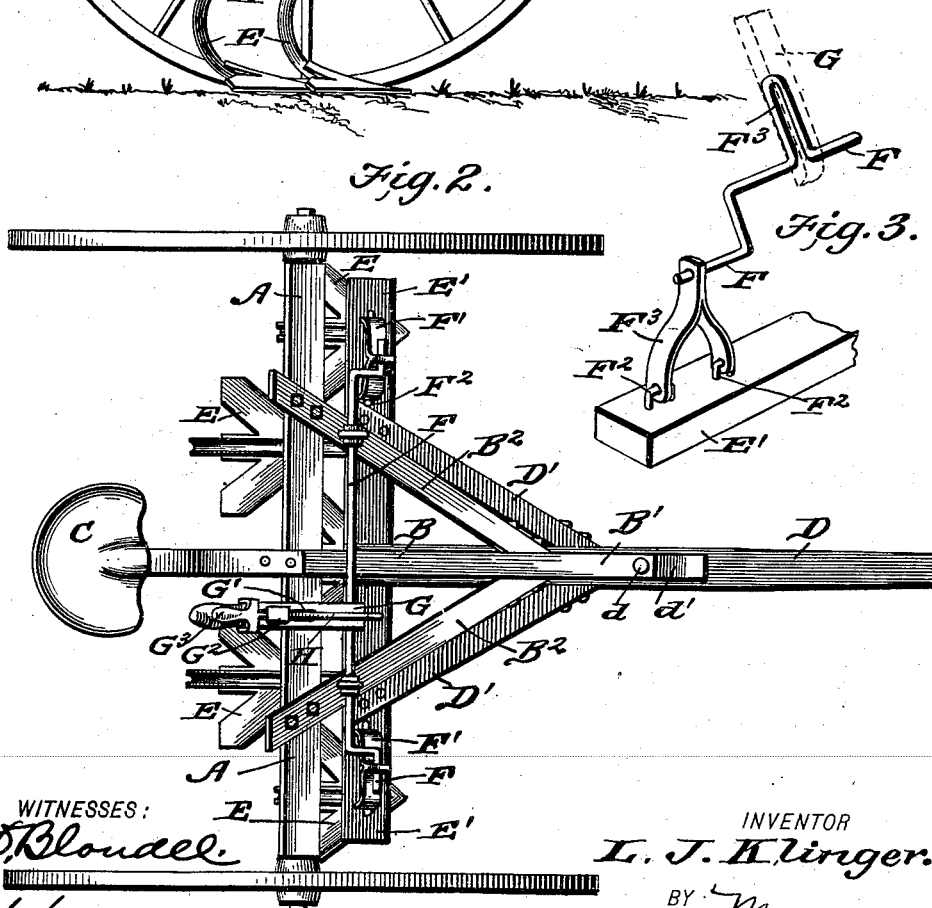
Figure 3:
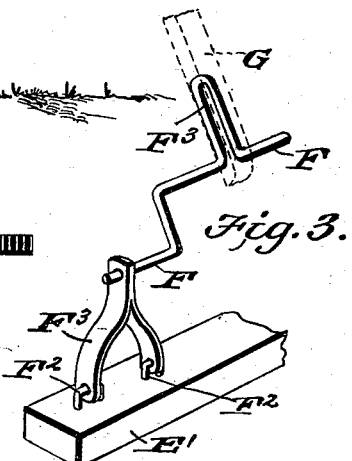

Figure 1 is a side view of my improved weeder. Fig. 2 is a plan view thereof, and Fig. 3 is a detail perspective view of a portion of the raising and lowering mechanism.

Referring to the drawings, A designates the wheel-supported axle of the main frame B of the weeder, said frame consisting of diverging brace-beams $B^2$, connected at their rear ends rigidly to the axle and securely holding between their forward ends the front portion of the main beam $B'$, which at its rear end is also rigidly secured to the axle and there supports the driver's seat C, while its forward end extends some distance beyond the brace-beams, as shown in Fig. 2. In this extension fits a pivot-bolt $d$, which is inserted through a block $d'$ on the plow-beam D and through the beam, the latter being thereby suspended from the main frame and free to move in a vertical plane. The rear end of the beam D has secured thereto a cross-beam $E'$, adapted to carry the plows E, which latter are mounted on curved standards, as shown, and arranged exactly underneath the axle A, so that they will always follow the contour of the ground traveled over by the wheels. The cross-beam $E'$ and plow-beam D are suitably braced, as shown at $D'$.

Mounted in suitable bearings on the rearwardly-diverging brace-beams $B^2$ of the main frame B is a rocking crank-shaft F, whose cranked ends are journaled in stirrups $F'$, the forked ends of said stirrups being pivotally held in ears $F^2$ on the cross-beam $E'$, and thus serve to brace the beam against lateral movement as well as acting in the capacity of links. By rocking the shaft F the plow-frame may be raised and lowered, and for this purpose the said shaft is arched between its ends, as at $F^3$, (see Fig. 3,) and to this portion of the shaft a hand operating-lever G is secured, said lever being provided with an elongated slot $G'$, by which it is fitted over a curved notched latch-bar H, pivotally mounted on a short post $H'$, secured to the cross-beam $E'$. The lever G is provided with a spring-pressed pawl $G^2$, retracted by a hand-grip $G^3$ in the usual manner. Now it will be seen that the hand-lever G and latch-bar H both serve as means for raising and lowering the plow-frame.

The front end of the plow-beam D, it should be noticed, is extended some distance beyond the point of connection between the main frame and the plow-frame and serves as the draft-pole of the machine, thereby enabling the draft-animals to exert a direct pull on the plows and relieving them from unnecessary strain, and it should also be observed that the plows extend approximately in a horizontal plane, and thus do not dig into the ground nor cause extra power to pull the machine.

Having thus described my invention, what I claim as new, and desire to secure by Letters Patent, is—

1. A wheeled weed-destroyer, consisting of a short main frame, an axle to which the former is rigidly attached, a draft tongue or beam extended in front and rear of and beneath said frame, and flexibly connected therewith, a cross-beam rigidly attached to the rear end of said draft-beam, and carrying plows or scraping devices, as shown and described.

2. A weed-destroyer, consisting of a main frame, a plow-carrying frame suspended from said main frame and movable in a vertical plane, a shaft mounted on said main frame and having cranked ends, stirrups mounted on said ends and having forked ends pivotally connected to said plow-carrying frame, a latch-bar pivotally connected to said latter frame, and a lever secured to said shaft and adjustably connected to said latch-bar, as set forth.

3. A weed-destroyer, comprising the wheel-supported main frame having a crank-shaft journaled thereon, a plow-beam pivotally connected to the front of said main frame, a plow-carrying cross-beam secured to the rear end of said plow-beam, stirrups connected to the cranked shaft and having forked lever ends connected to said cross-beam, a latch-bar pivotally connected to the main frame, a lever fastened to the crank-shaft to rock the same and having a slot receiving said latch-bar, and a pawl arranged for engagement therewith, and plows suspended from said cross-beam and extending in an approximately-horizontal plane, as and for the purpose set forth.

In testimony whereof I have signed my name to this specification in the presence of two subscribing witnesses.

LOUIS JOHN KLINGER.

Witnesses:
T. H. JOHNSTON,
S. H. EDMONDSON.